(12) United States Patent
Kalra, Jr.

(10) Patent No.: US 11,866,575 B2
(45) Date of Patent: Jan. 9, 2024

(54) BIODEGRADABLE POLYMER

(71) Applicant: Sanjay Daya Kalra, Jr., Jericho, NY (US)

(72) Inventor: Sanjay Daya Kalra, Jr., Jericho, NY (US)

( * ) Notice: Subject to any disclaimer, the term of this patent is extended or adjusted under 35 U.S.C. 154(b) by 0 days.

(21) Appl. No.: 18/062,845

(22) Filed: Dec. 7, 2022

(65) Prior Publication Data

US 2023/0174750 A1  Jun. 8, 2023

Related U.S. Application Data

(60) Provisional application No. 63/265,058, filed on Dec. 7, 2021.

(51) Int. Cl.
| | | |
|---|---|---|
| *C08L 3/02* | (2006.01) | |
| *C08L 29/04* | (2006.01) | |
| *C08L 3/04* | (2006.01) | |
| *C08J 3/24* | (2006.01) | |
| *C08J 3/03* | (2006.01) | |
| *C08J 3/05* | (2006.01) | |

(52) U.S. Cl.
CPC . *C08L 3/04* (2013.01); *C08J 3/03* (2013.01); *C08J 3/05* (2013.01); *C08J 3/24* (2013.01); *C08J 3/243* (2013.01); *C08L 3/02* (2013.01); *C08L 29/04* (2013.01); *C08L 2201/06* (2013.01)

(58) Field of Classification Search
CPC ......... C09D 103/00; C08L 3/02; C08L 29/04; C08L 2201/06
See application file for complete search history.

(56) References Cited

U.S. PATENT DOCUMENTS

| | | |
|---|---|---|
| 5,106,890 A | 4/1992 | Maruhashi et al. |
| 5,205,863 A | 4/1993 | Elion |
| 5,334,634 A | 8/1994 | Bastiolo et al. |
| 5,352,709 A | 10/1994 | Tarrant et al. |
| 5,821,286 A | 10/1998 | Xu et al. |
| 5,922,379 A | 7/1999 | Wang |
| 5,948,848 A | 9/1999 | Giltsoff |
| 7,235,594 B2 | 6/2007 | Han et al. |
| 8,153,783 B2 | 4/2012 | Muller et al. |
| 9,023,918 B1 | 5/2015 | Mistry et al. |
| 9,416,275 B2 | 8/2016 | Villada Castillo et al. |
| 2005/0288399 A1 | 12/2005 | Chen |
| 2016/0108217 A1 | 4/2016 | Drummond |
| 2017/0218184 A1 | 8/2017 | LaPray et al. |
| 2019/0322855 A1 | 10/2019 | Hiura |
| 2020/0339785 A1 | 10/2020 | Ota |

FOREIGN PATENT DOCUMENTS

| | | | | |
|---|---|---|---|---|
| CA | 2907518 A1 | * | 10/2014 | ............. A47L 13/16 |
| DE | 102016203786 A1 | * | 9/2016 | ................ B41J 2/01 |

* cited by examiner

*Primary Examiner* — Robert D Harlan
(74) *Attorney, Agent, or Firm* — Dunlap Bennett & Ludwig, PLLC; Anna L. Kinney

(57) ABSTRACT

A biodegradable polymer includes starch groups, a polyvinyl alcohol (PVA) backbone having a crosslinked layered configuration and a Schiff base structure bonded to the starch groups. The PVA backbone has double bonds, and the starch groups have reversible acetal linkages. The biodegradable polymer is produced by mixing starch and water; mixing partially hydrolyzed polyvinyl alcohol (PVA) and water; mixing the starch solution with the PVA solution; mixing in a catalyst; and mixing in a cross-linking agent and a dialdehyde.

12 Claims, 4 Drawing Sheets

BIODEGRADABLE POLYMER

CROSS-REFERENCE TO RELATED APPLICATION

This application claims the benefit of priority of U.S. provisional application No. 63/265,058, filed Dec. 7, 2021, the contents of which are herein incorporated by reference.

BACKGROUND OF THE INVENTION

The present invention relates to polymers and, more particularly, to a biodegradable polymer.

Presently, synthetic materials and plastics are non-biodegradable. Much of the world's pollution and environmental damage occurs through the deposition of unsafe plastics made from toxic petroleum-based chemicals. Biodegradable plastics are a new trend in scientific research. However, they lack adequate water and weather resistance for long term use.

Petroleum-based formulations of plastics are a major shortcoming in current commercial plastic production. These plastics do not biodegrade at all. Therefore, the disposal of these plastics is extremely difficult, often clogging and destroying environmental habitats by leaching extremely toxic molecules into organisms. Continuing to use these plastics will inevitably lead to the extinction of many species and their habitats and will even increase the rate of diseases among humans.

Moreover, petroleum-based formulations require high amounts of energy to produce and even to recycle. Producing the plastic first requires unsustainable petroleum extraction, then combining them with several toxic reagents which break down into cyanide and other extremely harmful byproducts. Consumers use plastic products, such as packaging and water bottles, for a few minutes and immediately dispose of them. However, they do not understand the vast amounts of extra energy required to properly produce them or recycle them into new plastics.

Many formulations of polymers and plastics today heavily depend on petroleum-based chemicals, which eliminate any chance of biodegradability while releasing toxic molecules for hundreds of years.

As can be seen, there is a need for a polymer formulation that is composed of biobased ingredients, without any petroleum-based chemicals, displaying full and non-toxic biodegradability within days through composting in soil or ocean water, and maintaining a comparable water, weather, ultraviolet, and scratch resistance found in petroleum-based formulations.

SUMMARY OF THE INVENTION

In one aspect of the present invention, a biodegradable polymer comprises starch groups, a polyvinyl alcohol (PVA) backbone having a crosslinked layered configuration, and a Schiff base structure bonded to the starch groups. The PVA backbone has double bonds, and the starch groups have reversible acetal linkages.

In another aspect of the present invention, a process of producing a biodegradable polymer comprises mixing starch and water to form an aqueous starch solution; mixing partially hydrolyzed polyvinyl alcohol (PVA) and water to form an aqueous PVA solution; mixing the aqueous starch solution with the aqueous PVA solution to produce a first aqueous intermediate product; mixing a catalyst into the first aqueous intermediate product to produce a second aqueous intermediate product; and mixing a cross-linking agent and a dialdehyde into the second aqueous intermediate product.

Advantageously, a biodegradable plastic polymer of the present invention is formed from non-toxic reagents. This achieves a biodegradable and safe substitute for plastic. This chemical formulation can be adapted for packaging, construction materials, and even fashion, while retaining water, UV-A and UV-B, scratch, and weather resistance. A smooth finished surface on this polymer formulation is further achievable. The polymer may be biodegradable in ocean water or soil within 50 days.

This polymer formulation may use 100% plant-based ingredients, may be readily and easily sourced from waste products, may be formed using 1/10th of the energy required to form petroleum-based plastics, and may be fully compostable. In addition, the polymer may be recast into another mold with only relatively small amounts of heat for recyclability and development into its next form for its next purpose. A polymer formulation meeting these requirements is necessary for the continued, sustainable utilization of plastics within our society.

These and other features, aspects and advantages of the present invention will become better understood with reference to the following drawings, description, and claims.

DETAILED DESCRIPTION OF THE INVENTION

Figure 1:
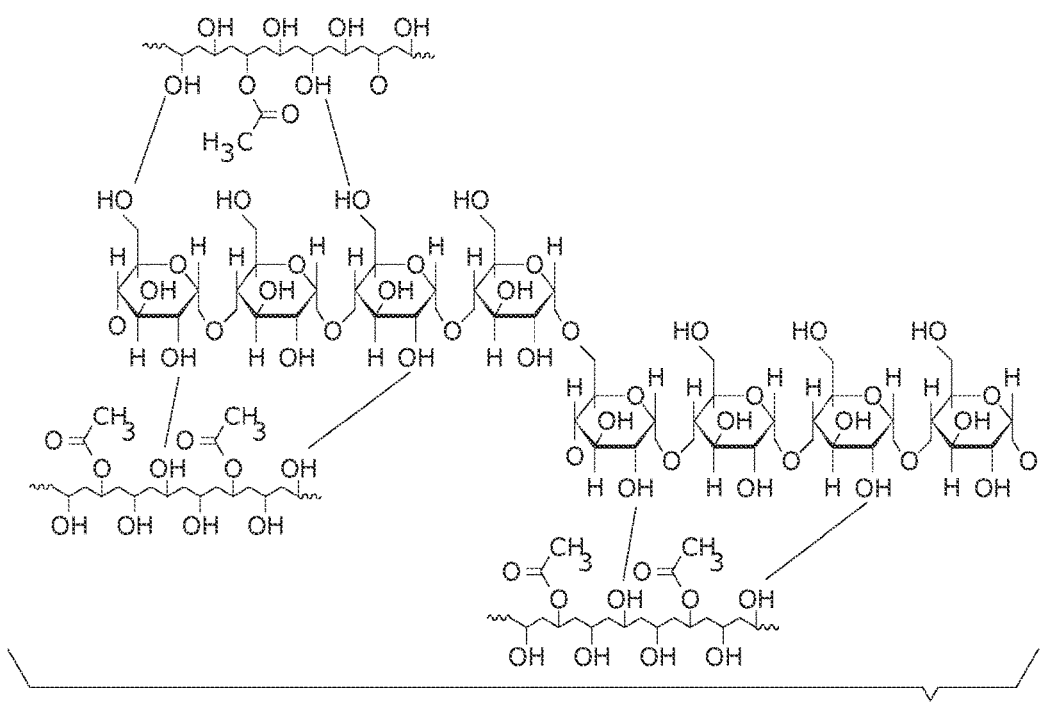
FIG. 1 is a schematic view of the chemical structure of a first intermediate product comprising polyvinyl alcohol (PVA) and starch according to an embodiment of the present invention.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims with reference to the drawings.

Ranges disclosed herein are not limited to their endpoints and may include ranges having as endpoints any values within the range.

A general overview of the various features of the invention will be provided, with a detailed description following. Broadly, an embodiment of the present invention provides a biodegradable plastic comprising a crosslinked polyvinyl alcohol (PVA) and starch complex.

The polyvinyl alcohol may be partially hydrolyzed, such as a degree of hydrolysis ranging from 80 to 97.5%. For example, PVA having about 87% hydrolysis improves biodegradability.

Any starch or starch-like carbohydrate may be used, such as Cassava starch or cellulose.

The biodegradable polymer further comprises a crosslinking agent. For example, Ammonium zirconium carbonate (AZC) is a water-soluble inorganic salt that has been widely used to improve the water resistance of coated papers or enhance the performance of xylan, galactoglucomannan, and starch films via the hydrogen linkages between Zr and hydroxyl groups. AZC has also been approved by the Food and Drug Administration (FDA) for use in the food packaging fields.

The crosslinking agent may have a co-agent to limit self-polymerization. For example, glyoxal may be used to limit the self-polymerization of AZC.

Free hydrophilic groups decrease water resistance. Some or all of the acetate groups from the PVA backbone may be catalytically replaced with a double bond to add hydrophobicity and structure. The polymer is characterized by hydrophobicity, in some cases having no residual unreacted hydrophilic pendant groups. An additional hydrophobic resin coating is unnecessary.

The biodegradable plastic is characterized by acetal linkages between starch groups, resulting in a layered network. The linkages are fully reversible, enabling biodegradability after as little as about 50 days.

The biodegradable plastic is also characterized by a Schiff base structure, which advantageously absorbs ultraviolet radiation or light at a wavelength of about 290 nm, e.g., UV-A and UV-B, and protects against degradation; i.e., the polymer is characterized by a resistance to degradation by ultraviolet radiation. This structure is particularly advantageous for packaging or as a wrapping to protect or seal objects.

The present invention may be used in a variety of industries that require plastics or hard materials including packaging, construction, computer products, and fashion. The polymer may be suitable to replace both soft and hard plastics depending on its casting thickness.

In some embodiments of the present invention, the polymer may form packaging with a high oxygen barrier, preventing degradation from sunlight and oxygen on sensitive food products for over 30 days. It may also form a hard brick-like product, heavy and resilient to erosion that may decompose without toxic chemicals released in a compostable/microbe-filled environment.

The present invention may also be molded into furniture that may support a weight as high as about 400 lbs and may be disposed of in a natural environment without any toxic leaching.

A method of producing the biodegradable plastic may comprise the steps described below, with reactions maintained at a reaction temperature of about 250° C. to about 280° C.

Starch, such as cassava starch, and PVA may be combined in an aqueous solution and heated. Immediately upon combining the two components, a first reaction occurs: a hydrogen bonding network between starch hydroxyl groups (—OH) and proximal hydroxyl groups of PVA. This intense hydrogen bonding holds the starch and the PVA together in a layered configuration, while exposing PVA's residual acetate groups ($CH_3COOH$). These acetate groups are still open on PVA molecules.

An alkyl amine, preferably triethylamine (TEA), may be used to catalyze an elimination reaction that attacks and removes the residual acetate groups. Starch and PVA are difficult to homogeonously mix together due to the 2 different phases they possess (cationic polymer phase and non-ionic boronate ester bonds). TEA is a homogeneous catalyst that increases miscibility between the two phases. TEA has been reported as a catalyst in transesterification reactions due to its suitable boiling point and promotion of amine-crosslinking in cationic polymers and non-ionic boronate ester bonds. TEA's three ethyl groups per molecule and its powerful catalytic nature enable its use in small quantities. While the amount of TEA may be stoichiometrically related to the number of residual acetate groups, the amount may be optimized to address variables such as selected degree of acetate removal, reaction speed, radical accessibility, etc. The TEA's nitrogen atom donates its reactive lone electron pair to a proximal hydrogen atom, forming a double bond between two carbons adjacent to the acetate group, moving electrons to the nearest acetate group, and fully removing the acetate group from the PVA molecule. $CH_3COOH$ is generally released from the solution in a gaseous form. Adding TEA to the hydrogen bonded starch-PVA solution may remove all acetate groups from the PVA molecule in some cases. In these cases, the catalyst is present in an amount effective to eliminate all acetate groups. Meanwhile, the starch binds to all trans-hydroxyl groups of the PVA molecule; i.e., the starch is present in an amount effective to bind to all trans-hydroxyl groups. These two reactions may form a hydrophobic PVA-starch composite due to a complete or near complete removal of acetate groups and an intense hydrogen bonding of most hydroxyl groups that otherwise may bind to water.

Remaining cis-hydroxyl groups that are open may be crosslinked using, as co-crosslinking agents, a crosslinker such as ammonium zirconium carbonate (AZC) and an aldehyde, preferably a dialdehyde such as glyoxal. Glyoxal is the smallest, non-toxic di-aldehyde molecule; it is a crucial ingredient in many Schiff-base reactions where an amine group of a separate species reacts with an aldehyde functional group of glycerol, creating a Schiff-base structure [i.e., $R^1R^2C=NR^3$ ($R^3$=alkyl or aryl, but not hydrogen]. The co-crosslinking agents may be present in an amount effective to bond to all remaining cis-hydroxyl groups.

AZC forms a hydrogen bonding network between the AZC molecules and starch-PVA cis-hydroxyl groups, bonding a majority of the remaining open hydroxyl groups. Amine groups ($NH_3$, gaseous) and carbon dioxide ($CO_2$, gaseous) are released.

One aldehyde group of the dialdehyde may be reacted with a remaining open hydroxyl group of the starch. This reversible acetalization reaction forms acetal linkages between the dialdehyde and starch.

The other aldehyde group of the dialdehyde reversibly crosslinks with an AZC amine group of the intermediate polymer product, resulting in a —CH=NH structure. The dialdehyde also stops AZC's self-polymerization via the unreleased $NH_3$ groups within the solution, preventing brittleness. The —C=N— structure may cause the solution to become yellow, indicating enhanced ultraviolet (UV) absorption and a new hemi-acetal structure.

A plasticizer such as glycerol may be added to the composition for smoothness.

In some embodiments, a botanical oil such as flax seed oil or epoxidized soybean oil may be added to the composition to increase hydrophobicity.

The polymer composition may be directly cast as a sheet, injected into various molds, or placed in a polymer extrusion machine, and dried for use as a polymer article in packaging, textiles, construction, and many other plastic end uses. The drying process may be automated using large polymer vats, depositing a steady stream on a moving conveyor belt at a set or predetermined thickness. The conveyer belt may move through an oven to quickly dry the polymer which may be rolled into large sheets after tempering.

Referring now to the Figures, FIG. 1-5 illustrate method steps of manufacturing a biodegradable polymer according to an embodiment of the present invention. FIG. 1 discloses the chemical structure of a first intermediate product comprising a hydrogen bonding layered network of polyvinyl alcohol (PVA) and starch. The PVA molecules have open or free hydrophilic pendant acetate groups.

Figure 2:
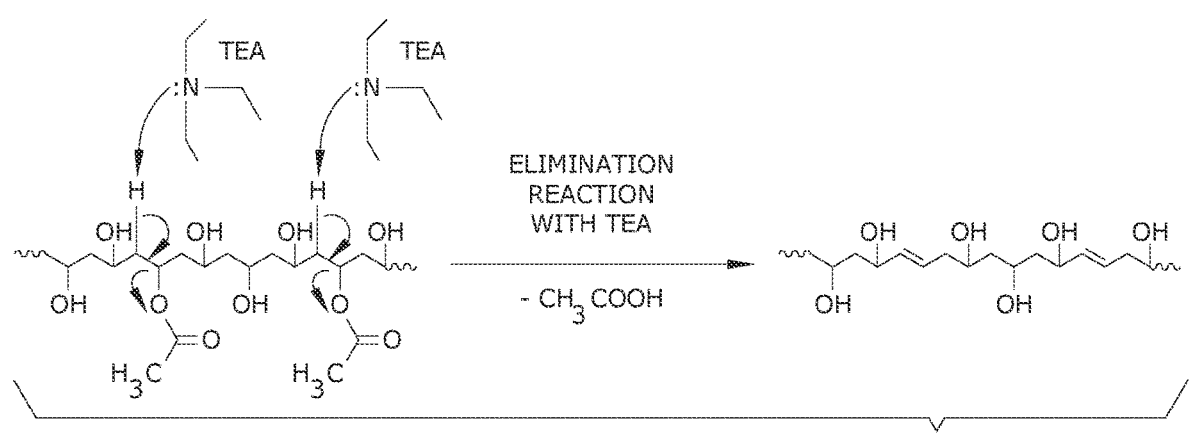
FIG. 2 is a schematic view of an addition reaction of the first intermediate product of FIG. 1 with triethylamine (TEA) by a step of a method according to an embodiment of the present invention.

FIG. 2 illustrates an elimination reaction utilizing triethylamine (TEA) to remove remaining acetate groups on the PVA backbone through a lone electron pair attack. A double bond is formed on the polymer backbone which adds hydrophobicity and structure.

Figure 3:
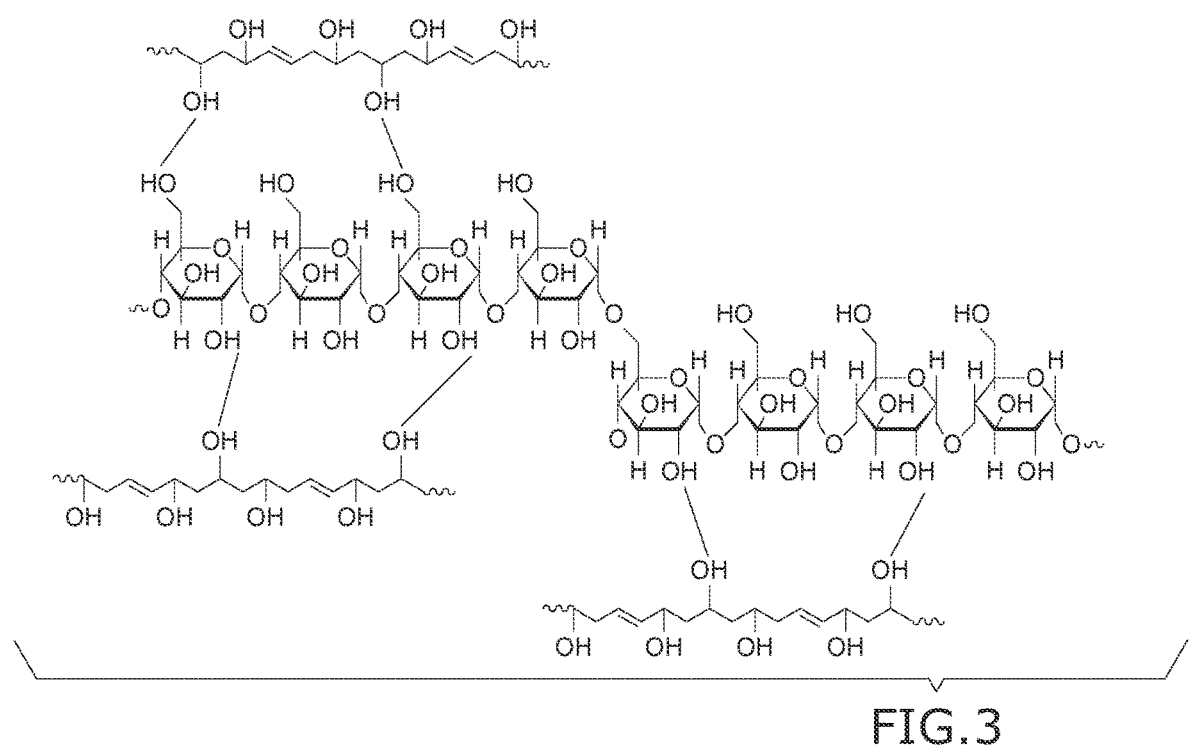
FIG. 3 is a schematic view of the chemical structure of a second intermediate product according to an embodiment of the present invention, produced by the step of FIG. 2.

As shown in FIG. 3, the elimination reaction of FIG. 2 results in a second intermediate product without acetate groups. The hydrogen bonding network between PVA and starch remains stable and hydrophobic.

Figure 4:
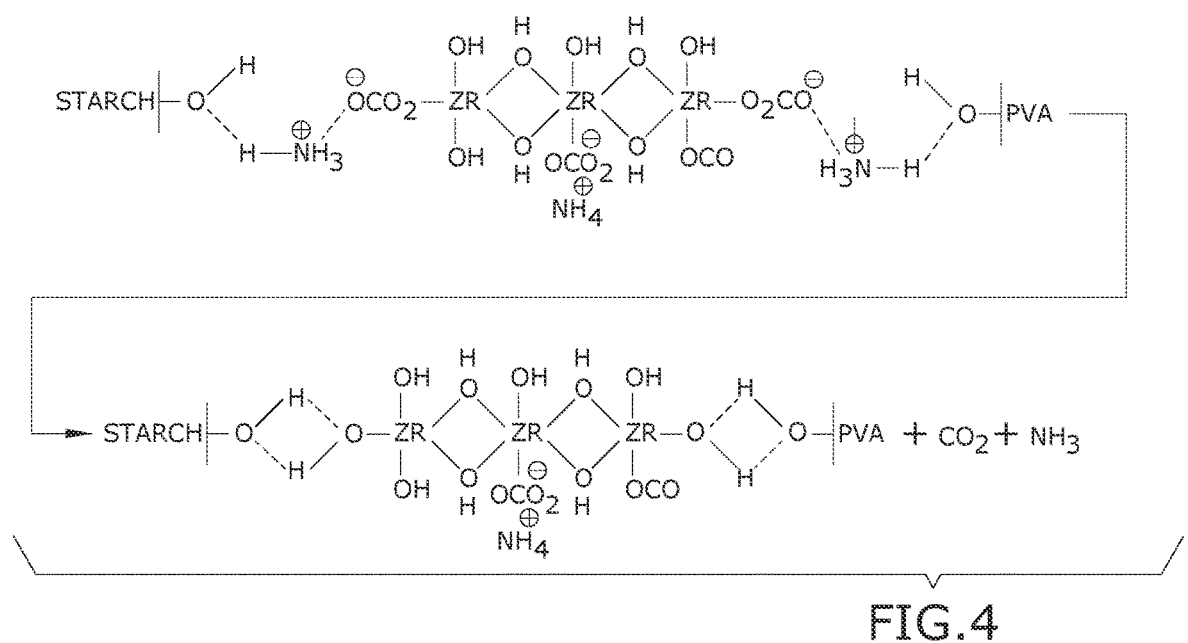
FIG. 4 is a schematic view of a crosslinking reaction between the second intermediate product of FIG. 3 and ammonium zirconium carbonate (AZC) by a step of the inventive method.

FIG. 4 illustrates the addition of ammonium zirconium carbonate (AZC) to the starch and PVA network. AZC bonds with open hydroxyl groups increasing hydrophobicity. Carbon dioxide and $NH_3$ are released.

Figure 5:
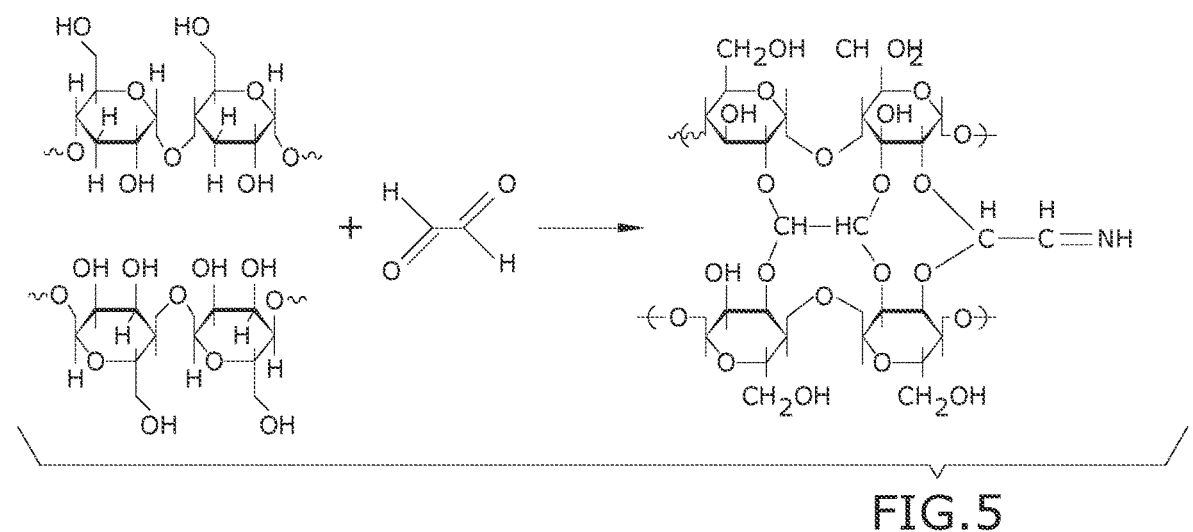
FIG. 5 is a schematic view of an addition of glyoxal by another step of the inventive method.

The addition of glyoxal to the starch-PVA-AZC complex shown in FIG. 5 produces acetal crosslinking and a Schiff base structure. Positively charged amino groups in AZC react with a first aldehyde group of glyoxal in a reversible Schiff base reaction. This stops self-polymerization of AZC, improving cross linking, and increases UV resistance. A second glyoxal aldehyde group reacts with free hydroxyl groups in the starch.

Figure 6:
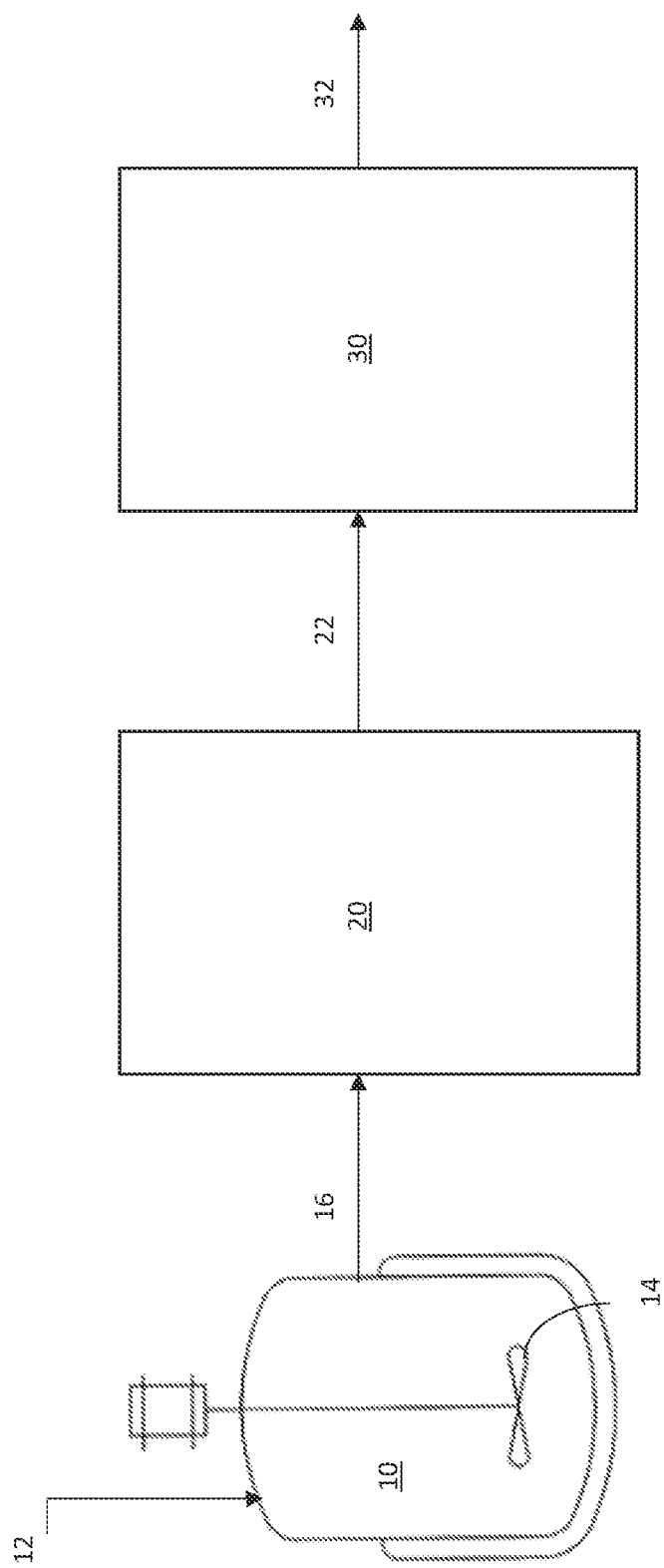
FIG. 6 is a schematic view of a system for producing biodegradable plastic products according to an embodiment of the present invention.

FIG. 6 illustrates a manufacturing system according to an embodiment of the present invention, comprising a vat or reactor 10, a forming apparatus 20, such as a mold, blow molding apparatus, extruder, or belt, and a drying apparatus 30, such as an oven. The reagents are introduced as described herein via an inlet 12, stirred or mixed with mixer 14, and reacted at predetermined temperatures for predetermined times. When the reactions are complete, the polymer is fed via line 16 to the forming apparatus 20, where the product is formed, and delivered, e.g., via a conveyor belt 22 to the drying apparatus 30. The formed and dried product is then removed from the drying apparatus 30 via line 32.

The detailed Example below is illustrative only and does not limit the scope of the present invention.

Example

A biodegradable polymer product is manufactured by the following steps.

1) 100 grams (g) of cassava starch pellets are dissolved in 1200 milliliters (mL) of distilled (DI) water. The mixture is stirred at 800 revolutions per minute (RPM) at 260° Celsius (C) until the solution is white and no solids are present.

2) 75 g of PVA are dissolved in 1000 mL of DI water. The solution may be microwaved to dissolve PVA in water and generate a clear, viscous solution, free of solids.

3) The cassava solution is combined with the PVA solution, placed on a hot plate with a large stir bar, and stirred at 800 RPM at 260° C. for 30 minutes.

5 mL of TEA (triethylamine) are added to the solution drop by drop. The solution is stirred as the drops are added and the catalyzed reaction is allowed to proceed for 30 minutes at 250-280° C. This step crosslinks starch and PVA, minimizes hydroxyl groups, and increases hydrophobicity.

5) 8 mL of ammonium zirconium(IV) carbonate (AZC) are added to the solution, which may immediately thicken. The solution is mixed with a heavy-duty stirring mechanism, such as a low or high shear mixer.

6) 16 mL of glyoxal are immediately added to the solution and the solution is stirred vigorously, as needed. Glyoxal is key to prevent AZC from self-polymerizing and reacts with the remaining unreacted hydrophilic functional groups of the cassava/PVA network.

7) 20 mL of glycerol plasticizer is added. The reaction proceeds at 260° Celsius for 20 minutes. The reaction is stopped when a deep yellow color is achieved, which indicates the reaction of glyoxal with the starch complex is complete, AZC self-polymerization is minimized, and complete UV resistance is achieved. In some cases, 10 mL of flaxseed oil is added to increase the hydrophobicity.

8) Turning off the heating element, DI water is added if needed to bring total volume to 2000 mL. The product is mixed thoroughly in a high shear mixer or emulsifier to prevent clumps and enhance the quality of the reaction.

9) When the solution cools to room temperature (approximately 25° C.), it is cast at a selected thickness onto, for example, a conveyor belt or sheet pan. The casting thickness may be, for example, about 0.6 cm for a 1 mm final thickness post drying, about 7 cm casting thickness for a 10 mm final thickness post drying, or about 0.4 cm for a 0.3 mm final thickness post drying.

10) The cast sheet is dried at 45° C. for 12-24 hours under very low humidity (30% or less) to promote water loss after which it is removed from drying.

The final product has a smooth finish with UV, water, weather, and scratch resistance properties. This material also has good tensile strength and other mechanical properties. A change to the relative amounts of reagents may result in an unstable polymer which will not hold up to construction, packaging, biodegradability, and other consumer standards.

It should be understood, of course, that the foregoing relates to exemplary embodiments of the invention and that modifications may be made without departing from the spirit and scope of the invention as set forth in the following claims.

What is claimed is:

1. A process of producing a biodegradable polymer, comprising:
   mixing starch and water to form an aqueous starch solution;
   mixing partially hydrolyzed polyvinyl alcohol (PVA) and water to form an aqueous PVA solution;
   mixing the aqueous starch solution with the aqueous PVA solution to produce a first aqueous intermediate product;
   mixing a catalyst into the first aqueous intermediate product to produce a second aqueous intermediate product;
   mixing a cross-linking agent and a dialdehyde into the second aqueous intermediate product; and
   adding a botanical oil to a mixture of the cross-linking agent, the dialdehyde, and the second aqueous intermediate product.

2. The process of claim 1, wherein the catalyst is triethylamine.

3. The process of claim 1, wherein the cross-linking agent is ammonium zirconium(IV) carbonate (AZC).

4. The process of claim 1, wherein the dialdehyde is glyoxal.

5. The process of claim 1, further comprising forming a polymer article having a predetermined thickness and drying the polymer article.

6. The process of claim 1, wherein starch is present in an amount effective to bond with all trans-hydroxyl groups in the PVA.

7. The process of claim 1, wherein the catalyst is present in an amount effective to eliminate all acetate groups from the PVA.

8. The process of claim 1, wherein the cross-linking agent and the dialdehyde are present in amounts effective to bond with all cis-hydroxyl groups in the second aqueous intermediate product.

9. The process of claim 1, wherein a reaction temperature is maintained at a reaction temperature between about 250° C. and about 280° C.

10. The process of claim 1, further comprising adding a plasticizer after mixing the cross-linking agent and the dialdehyde into the second aqueous intermediate product.

11. The process of claim 10, wherein the plasticizer is glycerol.

12. The process of claim 1, wherein the botanical oil is flaxseed oil or epoxidized soybean oil.

\* \* \* \* \*